Dec. 27, 1955    M. KERN    2,728,178
ENVELOPE STUFFING AND SEALING MACHINE
Filed March 26, 1952    6 Sheets-Sheet 1

INVENTOR
Max Kern
BY
Dale A. Bauer
ATTORNEY

Dec. 27, 1955   M. KERN   2,728,178
ENVELOPE STUFFING AND SEALING MACHINE
Filed March 26, 1952   6 Sheets-Sheet 2

INVENTOR
Max Kern
BY
Dale A. Bauer
ATTORNEY

Dec. 27, 1955                    M. KERN                    2,728,178
              ENVELOPE STUFFING AND SEALING MACHINE
Filed March 26, 1952                                6 Sheets-Sheet 4

INVENTOR
Max Kern
BY
Dale A. Bauer
ATTORNEY

Dec. 27, 1955  M. KERN  2,728,178
ENVELOPE STUFFING AND SEALING MACHINE
Filed March 26, 1952  6 Sheets-Sheet 5

INVENTOR
*Max Kern*
BY
*Dale A. Bauer*
ATTORNEY

Dec. 27, 1955  M. KERN  2,728,178
ENVELOPE STUFFING AND SEALING MACHINE
Filed March 26, 1952  6 Sheets-Sheet 6

INVENTOR
Max Kern
BY
Dale A. Bauer
ATTORNEY

United States Patent Office 2,728,178
Patented Dec. 27, 1955

2,728,178

ENVELOPE STUFFING AND SEALING MACHINE

Max Kern, Konolfingen, Switzerland

Application March 26, 1952, Serial No. 278,594

Claims priority, application Switzerland July 7, 1951

15 Claims. (Cl. 53—136)

This invention relates to envelope stuffing machines such as are employed for inserting letters, circulars, documents or other mail matter into envelopes.

One of the objects of the present invention is to provide a novel envelope stuffing machine which is comparatively simple in construction, positive in operation, and inexpensive to manufacture, and which will insert folded letter-sheets, circulars, documents, and the like, as well as other sheet-like inclosures, into envelopes at a high rate of speed with reliable accuracy.

Another object of the invention is to provide a novel envelope sutffing machine which will rapidly and efficiently fold letter-sheets, circulars, documents, and the like, to envelope size, and insert the same into envelopes.

Another object is to provide an envelope stuffing machine of novel construction which will effectively insert folded letter-sheets, circulars, and the like, as well as other sheet-like inclosures, into envelopes, and discharge said envelopes therefrom in sealed condition.

Another object is to provide a novel envelope stuffing machine which is capable of inserting into envelopes, folded letter-sheets, documents, circulars, and the like, or similar inclosures such as, cards, paper slips, leaflets and the like, or folded letter-sheets, documents, circulars, and the like combined with cards, paper slips, leaflets, return envelopes, and the like, as desired.

A further object is to provide an envelope stuffing machine of novel construction, whereby additional inclosures, such as cards, paper slips, leaflets, return envelopes, and the like, may be efficiently enclosed within folded letter-sheets, circulars, and the like, during the folding of the letter and prior to insertion of the same into the envelopes.

Still another object is to provide an envelope stuffing machine having novel simplified means for inserting folded letter-sheets, circulars, and the like, as well as other sheet-like unfolded inclosures, into envelopes in a positive and reliably accurate manner.

Another object is to provide an envelope stuffing machine having means of novel construction and operation for extracting an envelope from a supply thereof, opening the flap of said envelope, opening the body of said envelope, and accurately positioning said envelope for the reception therein of the insert material.

Still another object is to provide a novelly constructed sheet folding, envelope stuffing and sealing machine which is comparatively small in size and light in weight, and which may be table-mounted and conveniently transported from place to place.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a vertical longitudinal sectional view of a sheet folding, envelope stuffing and sealing machine embodying the present invention;

Figures 11, 12:
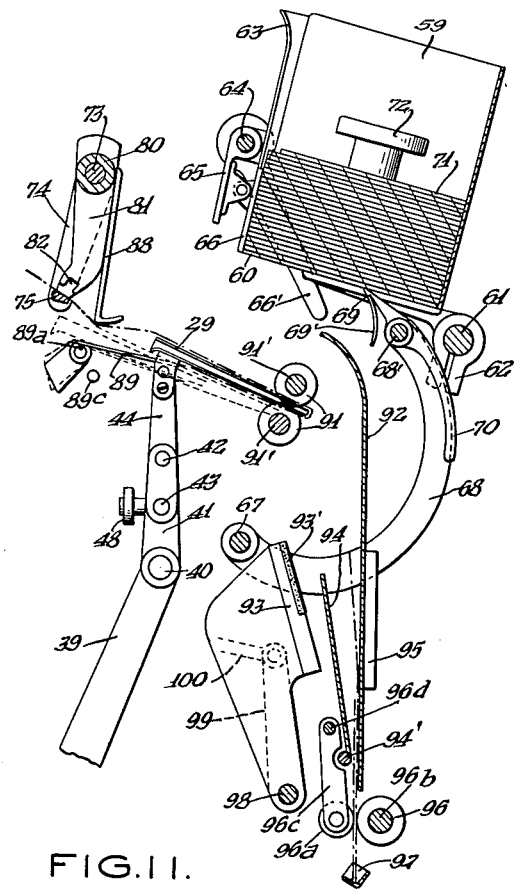

Figs. 7 to 10, inclusive, are side elevational views, partly in section, showing successively certain of the parts in the positions they occupy for effecting the extraction of an envelope from the supply and the positioning of said envelope for the introduction of the stuffing device therein;

Fig. 11 is a side elevational view, partly in section, showing certain of the parts in the positions they occupy when the stuffing device is introduced into the envelope and the latter with the inclosures therein is advanced to an envelope-flap moistening device; and Figure 12 is a fragmentary side elevational view, partly in section, showing certain of the parts in the positions they occupy for effecting the moistening of the envelope-flap, the closing and sealing of the moistened envelope-flap, and the discharge of the sealed envelope from the machine.

Referring to the drawings which illustrate, by way of example, one embodiment of the present invention, 1 indicates a base-plate having suitably secured thereto two upright side frame members 2 and 3. Disposed between and journalled in suitable bearings in the side members 2, 3 is a pair of sheet feeding rollers 4 and 5, and a set of sheet folding rollers 6, 7 and 8. The rollers 4 to 8 are provided at opposite ends thereof with journals 9 (Figs. 2 and 6) and secured to said journals exteriorly of the side member 2 are gears 9' which mesh with each other. The rollers 4 to 8 are all of the same diameter, and the gears 9' are of the same pitch diameter so that said rollers are driven at the same peripheral speed. Located below the rollers 4 to 8 is a main drive shaft 11 passing through and journalled in suitable bearings in the side members 2, 3. Secured to one end of the shaft 11 exteriorly of the side member 2 is a gear 12 which meshes with a relatively wide face gear 10 which, in turn, meshes with the gear 9' on the feed roller 4 to impart rotation to the rollers 4 to 8 during the operation of the machine. Gear 12 meshes with and is driven by the smaller gear of a compounded intermediate gear 13 which is suitably journalled on the side member 2, the larger gear of said compound meshing with a pinion 14 secured to the armature shaft of an electric motor 15 which is suitably supported between the side members 2, 3 and drives the machine. The shaft 11 is driven so that it makes one revolution for each cycle of operation of the machine.

Disposed above the group of rollers 4 to 8 and suitably supported by the side-members 2, 3, is a sheet registering or positioning plate 16 inclined at an acute angle with respect to the horizontal. In the illustrated embodiment, the plate 16 is disposed at an approximate angle of 60 degrees to the horizontal. Disposed opposite and forwardly of the plate 16 is a forwardly inclined support-plate 17 for a supply of insert material, such as lettersheets, circulars, documents, and the like. The sheet registering plate 16 is provided with adjustable lateral guides 18 and has its lower end located adjacent to the bite of the feeding rollers 4 and 5. Located below the plate 16 is a transverse rock shaft 19 having a sheet gage or stop 20 secured thereto for pivotal movement into and out of the path of sliding movement of a letter or other sheet on the plate 16. The operation of the rock shaft 19 and sheet stop 20 is synchronized with the operations of other mechanisms of the machine, and when the sheet stop 20 is swung downwardly, the sheet on the plate 16 is released and slides by gravity from said plate and enters between the driven feeding rollers 4 and 5. When the sheet stop 20 is thereafter swung upwardly to the position shown in Fig. 1, the sliding movement of the next sheet placed on the plate 16 from the supply on the plate 17 is arrested by said stop and is properly positioned parallel with the axes of the feed rollers 4, 5 for subsequent feeding accurately to said rollers in the manner described during the next cycle of operation of the machine. There is provided a second sheet gage or stop in the form of two pins 22 spaced upwardly from the sheet stop 20 and secured to a transverse rock shaft 21, whereby the feeding of successive sheets to the rollers 4, 5 at predetermined intervals is assured and facilitated. The shaft 19 is journalled at its opposite ends in suitable bearings in the side members 2, 3, and the shaft 21 is journalled in suitable bearings provided on the plate 16. The shafts 19, 21 and stops 20, 22 are actuated by mechanism to be hereinafter described.

Figure 5:
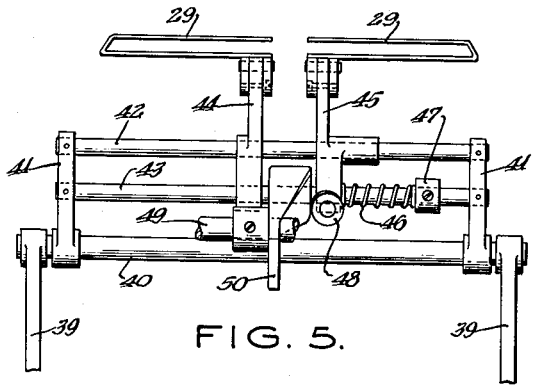
Fig. 5 is a rear elevational view of the stuffing device or pocket and operating means therefor.

Each letter or other sheet delivered between the feeding rollers 4 and 5 upon downward pivotal movement of the sheet stop 20 is advanced by said rollers between the feeding roller 5 and folding roller 6 which further advance said sheet into and along a fold plate 23 until the leading edge of the sheet strikes a stop 25 disposed within said fold plate and adjustably secured thereto by a clamp screw 24. The fold plate 25 is arranged at an approximate angle of 45 degrees to the horizontal and comprises upper and lower plates suitably carried in spaced parallel relation by the side members 2, 3. Upon engagement of the leading edge of the sheet with the stop 25 in fold plate 23, the position of the first fold in the sheet is determined, and due to continued feeding action of the rollers 5, 6 on the trailing portion of said sheet, the latter is caused to buckle towards and into engagement with the rollers 6 and 7, whereupon the latter rollers grip the sheet at the buckled portion thereof, thus forming a first fold in said sheet. The once-folded sheet is then advanced by the rollers 6, 7 into and along a second fold plate 26 until the leading folded edge of said sheet strikes a stop 28 disposed within said plate and adjustably secured thereto by a clamp screw 27. The fold plate 26 is also arranged at an approximate angle of 45 degrees to the horizontal and comprises upper and lower plates suitably carried in spaced parallel relation by the side members 2, 3. Upon engagement of the leading folded edge of the once-folded sheet with the stop 28 in fold plate 26, said sheet is again caused to buckle, this time towards and into engagement with the rollers 7 and 8, whereupon the latter rollers grip the once-folded sheet at the buckled portion thereof, thus forming a second fold in said sheet parallel to the first fold. The twice folded letter or other sheet is then advanced by the rollers 7 and 8 into a tapered stuffing device or pocket 29 which is disposed horizontally in front of said rollers with the larger or wider end adjacent the rollers and the smaller or narrower end remote from said rollers. As shown in Fig. 5, the stuffing device 29 is in the form of an open-ended flattened tube divided into two transversely spaced and aligned sections for a purpose to appear hereinafter.

There is provided below the sheet registering or positioning plate 16 a horizontal plate 33, a co-operating front stop or gage 34, and a pair of opposed feeding rollers 35 and 36. The plate 33 is suitably supported by the side members 2, 3 and is provided with a portion 33' inclined downwardly at an approximate angle of 60 degrees to the horizontal and extending substantially to and disposed substantially in the plane of the bite of the rollers 35, 36. The rollers 35, 36 are journalled at opposite ends thereof in suitable bearings in the side members 2, 3. The roller 36 is driven by the aforementioned gear 10 which is secured to one of the journals of said roller, and the roller 35 is driven by the roller 36 through frictional contact therewith. The front stop or gage 34 is secured to a transverse rock shaft 148 which is journalled at opposite ends thereof in the side members 2, 3 and is operated in synchronism with the stops 20, 22 by mechanism to be hereinafter described. The plate 33 is adapted to support a supply of supplemental inclosures or inserts, such as cards, paper slips, leaflets, return envelopes, and the like, which do not require folding thereof in the machine prior to insertion of the same into the envelopes. A supplemental insert taken from the supply thereof on plate 33 is placed on the plate-portion 33' and in feeding position against the front stop 34. Upon downward pivotal movement of the stop 34, the supplemental insert is received by the rollers 35, 36 from the plate 33, 33' and advanced by said rollers into and through a curved funnel-shaped feed-chute 37 which is located with its smaller or narrower end opening into the fold plate 26 adjacent to and substantially tangent with the bite of the folding rollers 7 and 8. The feed-chute 37 may be suitably carried by the side members 2, 3 or the fold plate 26, and serves to guide the supplemental inserts from the rollers 35, 36 through said fold plate and directly between the rollers 7, 8 for movement thereby into the stuffing device or pocket 29.

Figure 4:
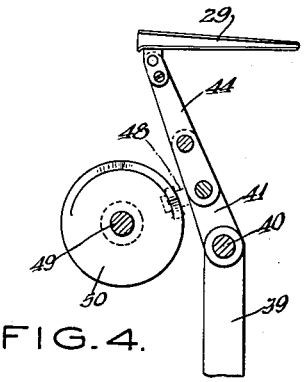
Fig. 4 is a detail side elevational view, partly in section, of the left-hand section of a stuffing device or pocket, as viewed in Fig. 5 and looking from the right of said figure.

Disposed below the group of rollers 4 to 8 is a transverse rock shaft 38 which is journalled at its opposite ends in suitable bearings in the side members 2, 3. Secured to the shaft 38 interiorly of and adjacent to the side members 2, 3 are two levers 39 which are connected together at their upper ends by a transverse rod 40. Secured to the rod 40 adjacent the levers 39 are two levers 41 which, in turn, are connected together by two transverse parallel rods 42 and 43. Secured to the rods 42, 43 is an arm 44 (Figs. 4 and 5) to the upper end of which is secured one of the sections of the stuffing device or pocket 29. Slidably mounted on the rods 42, 43 is a second arm 45 (Fig. 5) to the upper end of which is secured the other of the sections of the stuffing device or pocket 29. Surrounding the rod 43 is a coil compression spring 46 having one end thereof engaging against the arm 45 and the opposite end engaging against a collar 47 secured to said rod. Journalled on the arm 45 is a roller 48 which is adapted to engage an end cam 50 when the stuffing device 29 is in its normal insert-receiving position shown in Fig. 1, said roller being yieldingly urged towards and into engagement with said cam by the expanding action of the spring 46. The cam 50 is fixed on a transverse shaft 49 which is journalled in suitable bearings in the side members 2, 3. As will be hereinafter described, the shaft 49 is driven to make one complete revolution for each cycle of operation of the machine, and is clutch controlled so that the stuffing device or pocket 29, and the envelope feeding and moistening devices to be hereinafter described and actuated from said shaft, will only be thrown into operation when and while the machine is supplied with the material to be inserted into the envelopes.

It will be apparent that upon rotation of the shaft 49 and engagement of the cam 50 thereon with the roller 48, the movable section of the stuffing device or pocket 29 will be shifted laterally relative to the fixed section, first outwardly farther away from said fixed section by the cam to expand the pocket 29 and thereby facilitate insertion of the insert material into said pocket by the rollers 7 and 8, and then inwardly closer to the fixed section by the spring 46 to again contract the pocket 29 for the introduction of the latter together with the contents thereof into an opened envelope, as hereinafter described.

The stuffing pocket or device 29 is rocked from its normal insert-receiving position (Fig. 1) adjacent the rollers 7 and 8 to envelope stuffing position (Fig. 11) once for each cycle of operation of the machine. For this purpose, the shaft 38 has secured thereto exteriorly of the side member 2 a lever 51 (Fig. 2) having connected thereto one end of an extension coil spring 52 the opposite end of which is connected as at 53 to said side member. The lever 51 has journalled thereon a roller 54 which engages a cam 55 and is maintained in engagement with said cam by the contracting action of the spring 52. The cam 55 is journalled on a stud 56 carried by the side member 2, and said cam is driven from the clutch controlled shaft 49 through gears 57, 57', 58 and 106 of identical size to make one complete revolution for each cycle of operation of the machine. The gear 57 is secured to the cam 55, the gear 106 is secured to the shaft 49, and the gears 57' and 58 are suitably journalled on the side member 2. The stuffing device or pocket 29 is thus rocked about the axis 38 forwardly away from the rollers 7, 8 by the spring 52, and rearwardly towards said rollers by the cam 55.

Spaced forwardly of the sheet positioning plate 16 and of the sheet-supply-supporting plate 17, and disposed approximately at the same level as said plates, is a forwardly inclined magazine or holder 59 for receiving and supporting a supply of envelopes which are piled in said magazine with their sealing flaps folded and at the bottom and facing towards the front of the magazine. The magazine 59 is provided in the floor or bottom wall thereof with an opening 60 to expose the sealing flap of the lowermost envelope and to provide an outlet for the withdrawal of said envelope. The rear wall 63 of the magazine 59 terminates at the lower end thereof a distance above the bottom wall of said magazine to provide a free space between said bottom wall and said rear wall. The magazine 59 is adjustable to accommodate envelopes of different sizes, and is supported by a transverse shaft 61 through the medium of split-arms 62 which are secured to opposite sides of said magazine and are releasably clamped to said shaft for adjustment therealong. Shaft 61 also serves as a tie-member for the side-frame members 2 and 3.

Spaced rearwardly of the magazine 59 is a short transverse shaft 64 which is journalled in suitable bearings on the side walls of said magazine. Secured to the shaft 64 centrally thereof is a lever 65 provided with a gate-piece 66 which is adapted to close the space beneath the rear wall 63 of the magazine 59 and thereby prevent accidental withdrawal of more than one envelope at a time from said magazine. Disposed below the magazine 59 is a transverse rock shaft 67 having secured thereto interiorly of and adjacent to the side members 2, 3 two curved arms 68 which rotatably carry at their upper ends a transverse rod 68'. Secured to the rod 68' is an envelope-flap opening member 69 which is of relatively narrow width and is provided with a counterweight 70 for continuously urging said member upwardly into engagement with the lowermost envelope in the magazine 59 through a longitudinal opening in the bottom wall of said magazine. The flap-opening member 69 is tapered to a thin edge at the leading end thereof, and is provided at said end with a curved flap-deflecting portion 69'. A cover plate 71 provided with a handle 72 is loosely placed on top of the envelopes in the magazine 59 to compress the same and apply downward pressure thereon. Rocking motion is imparted to the shaft 67 and levers 68 once for each cycle of operation of the machine, and this operation is clutch controlled and is effected by means to be hereinafter described.

Figure 7:
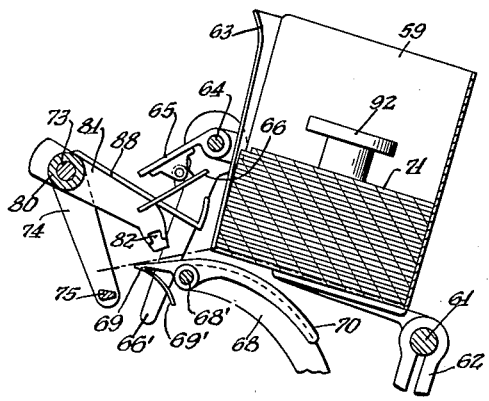

It will thus appear that when the levers 68 are rocked rearwardly in the direction of the rollers 4 to 8, the envelope-flap opening member 69 rides along the lowermost envelope in the magazine 59, engages the flap of said envelope, deflects and unfolds the same and extends it beyond the rear wall 63 of said magazine, as shown in Fig. 7. While the flap of the lowermost envelope is being unfolded and extended by the member 69, the gate-piece 66 is swung away from the magazine 59, as shown in Fig. 7, to completely release said flap. For this purpose, the shaft 64 has secured thereto an arm 66' which extends downwardly therefrom into the path of rearward movement of the rod 68' for engagement and operation by said rod. After the sealing flap of the lowermost envelope is unfolded and extended by the flap-opening member 69, the levers 68 are rocked in the opposite direction and returned to their original positions, whereupon the member 69 is also returned to its original position, and the arm 66' is released by the rod 68' causing the gate-piece 66 to swing closed and trap all but the lowermost envelope in the magazine 59.

Figure 2:
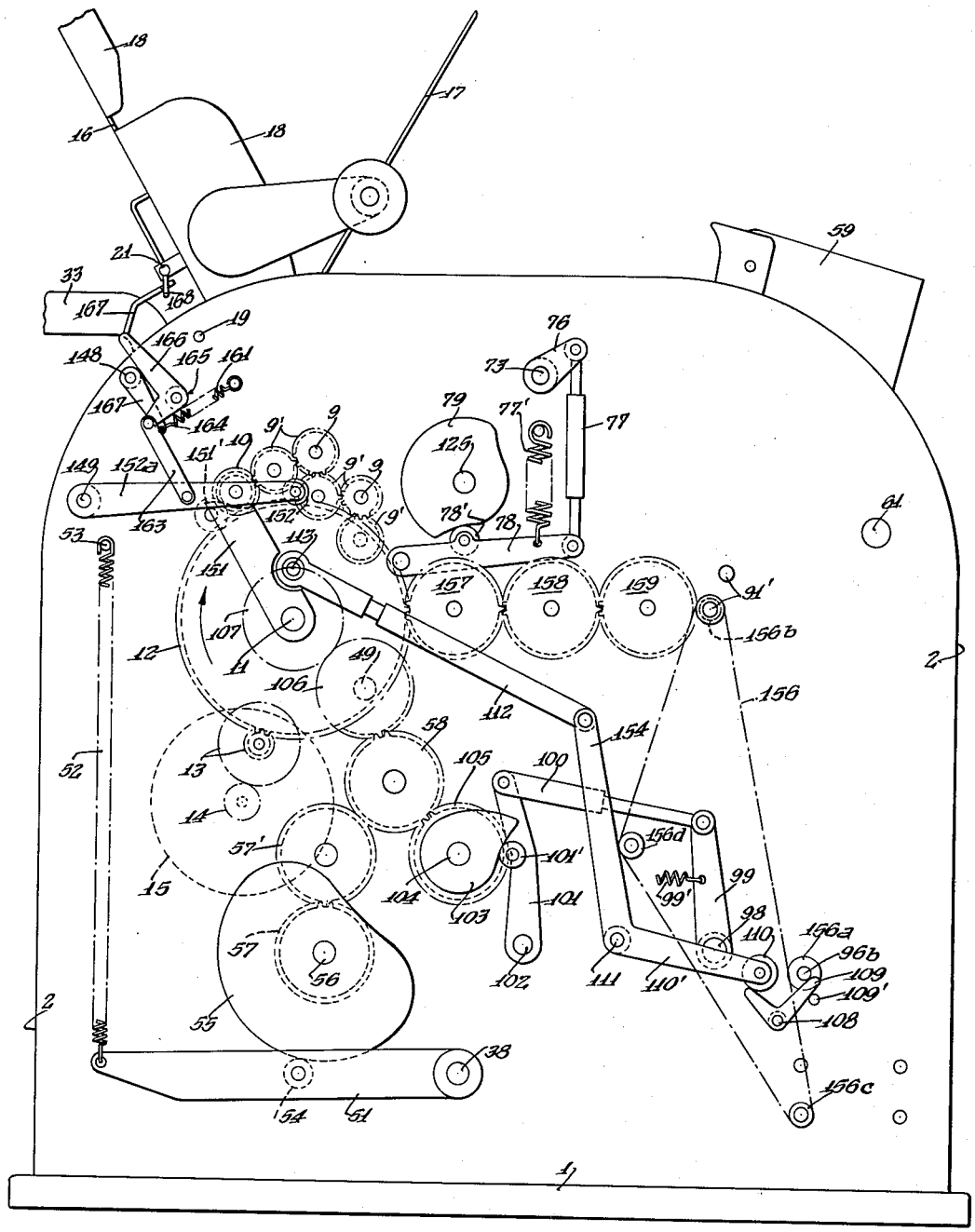
Fig. 2 is an elevational view looking toward one side of said machine.
Figure 8:
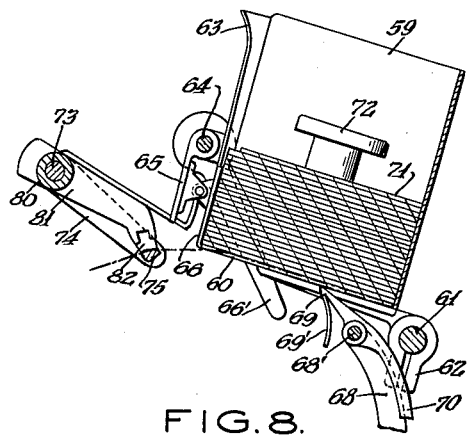

Substantially simultaneous with the retraction of the envelope-flap-opening member 69, the extended sealing flap of the lowermost envelope is seized by cooperating gripper elements 75 and 82, as shown in Fig. 8, at transversely spaced points for extracting said envelope downwardly and rearwardly from the magazine 59 in the direction of the rollers 4 to 8, said extraction occuring after the gate-piece 66 is closed so that the next or overlying envelope in the magazine is held by said gate-piece against movement from said magazine with the lowermost envelope. The gripper element 75 is in the form of a single wedge-shaped bar extending transversely of the machine and secured at opposite ends thereof to two levers 74 which are disposed interiorly of the side members 2, 3 and are secured to a transverse rock shaft 73 extending through and journalled in suitable bearings in said side members. Rocking movement is imparted to the shaft 73, levers 74 and gripper-bar 75 once for each cycle of operation of the machine, and this operation is effected through the medium of a lever 76, a connecting rod 77, an extension coil spring 77', a lever 78 and a cam 79 (Fig. 2). The lever 76 is disposed exteriorly of the side member 2 and is secured to the shaft 73, the cam lever 78 is pivotally mounted on said side member, the connecting rod 77 is pivotally connected to said levers, and the cam 79 is fixed on one end of a transverse shaft 125 and engages a roller 78' journalled on the lever 78. The roller 78' is maintained in engagement with the cam 79 by the spring 77' which has one end thereof connected to the lever 78 and the opposite end connected to the side member 2. The shaft 125 is clutch controlled and is driven to make one revolution for each cycle of operation of the machine by gearing to be presently described.

Telescoped over and rotatably mounted on the shaft 73 is a tubular shaft 80 having one end thereof journalled in and projecting through a suitable bearing in the side member 3. Secured to or formed integrally with the tubular shaft 80 are two axially spaced arms 81 which carry at their lower ends the gripper elements or pads 82. Secured to the tubular shaft 80 exteriorly of the side member 3 is an arm 83 (Figs. 3 and 6) having journalled thereon a roller 83' which is adapted to be engaged by a cam 84 that is secured to the clutch controlled shaft 125. Engagement of the high part of the cam 84 with the roller 83' holds the arms 81 and gripper pads 82 in the normal positions thereof shown in Figs. 1, 7 and 8 for a predetermined portion of a cycle of operation of the machine. Secured to the tubular shaft 80 also exteriorly of the side member 3, or formed integrally with the arm 83, is another arm 87 which is adapted to be engaged by a roller 85 journalled on a gear 86 which is secured to and drives the clutch controlled shaft 125 and is disposed between the cam 84 and the side member 3. Engagement of the roller 85 with the arm 87 effects pivotal movement of the arms 81 and gripper pads 82 relatively to and away from the gripper bar 75 to release the extracted envelope. The arm 83 and gripper pads 82 are continuously urged in the direction of the cam 84 and gripper bar 75, respectively, by suitable resilient means such as, for example, an extension coil spring 87' having one end connected to said arm and the opposite end connected to the side member 3.

In the operation of the gripper elements 75 and 82 during one cycle of operation of the machine, let us assume that the shafts 67 and 125 are in operation, and that the sealing flap of the lowermost envelope in the magazine 59 is being unfolded and extended by the flap-opening member 69. At this time, the gripper arms 81 and pads 82 occupy the positions thereof shown in Fig. 7 effected through engagement of the high part of cam 84 with the roller 83', and the gripper bar 75 is being rocked towards the gripper pads 82, effected by the contracting action of the spring 77' under the control of the cam 79, until said gripper bar engages the now extended envelope-flap and yieldingly presses it against the gripper pads 82. Thereupon the cam 84, through continued rotation thereof, moves out of engagement with the roller 83', thus releasing the arm 83 for free pivotal movement in the direction of said cam and thereby enabling pivotal movement of the gripper arms 81 and pads 82 toward and with the gripper bar 75 under the contracting action of the spring 87'. Thereupon the high part of the cam 79, through continued rotation of said cam, engages the roller 78' and swings the gripper bar 75, accompanied by the gripper arms 81 and pads 82 with the extended envelope-flap firmly gripped by and between the same, about the axis 73 downwardly and rearwardly from the positions thereof shown in Fig. 8 to the positions shown in Fig. 10, thus completely extracting the lowermost envelope from the magazine 59 and positioning the same as shown in broken lines in Fig. 10. The grippers 75, 82 with the envelope-flap gripped thereby pause for a predetermined interval in the positions thereof shown in Fig. 10 to enable introduction of the stuffing pocket or device 29 into the extracted envelope, as hereinafter described.

Figure 9:
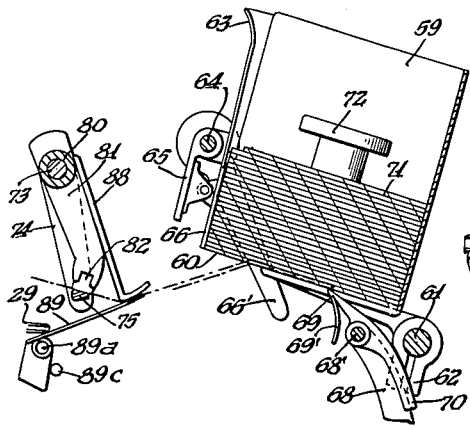
Figure 10:
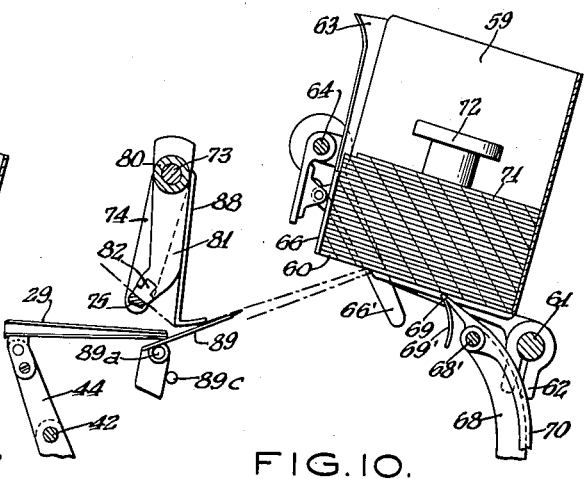

In the extracted position of the envelope, as shown in Fig. 10, it will be noted that the envelope has been drawn by the grippers 75, 82 over transversely spaced guide tongues or blades 89 such that the extended flap of said envelope is disposed over said blades and the latter project into the mouth of the envelope. The gripper arms 81 have secured thereto L-shaped fingers 88 which operate to press the extended envelope-flap downwardly towards and against the guide tongues 89 during the extraction of the envelope from the magazine 59 and thereby cause the body of said envelope to open, as shown in Fig. 10, for the reception of said tongues into the mouth thereof. The guide tongues 89 are angularly disposed across the outlet end of the stuffing device or pocket 29, and are mounted for rotary yielding movement on stub shafts or pins 89ª secured to and projecting inwardly from the side members 2, 3. Suitable resilient means such as, for example, torsion springs 89ᵇ are provided for yieldingly urging the guide tongues 89 upwardly until stop dogs connected thereto abut against stop-pins 89ᶜ as shown in Figs. 1 and 9.

Figure 1:
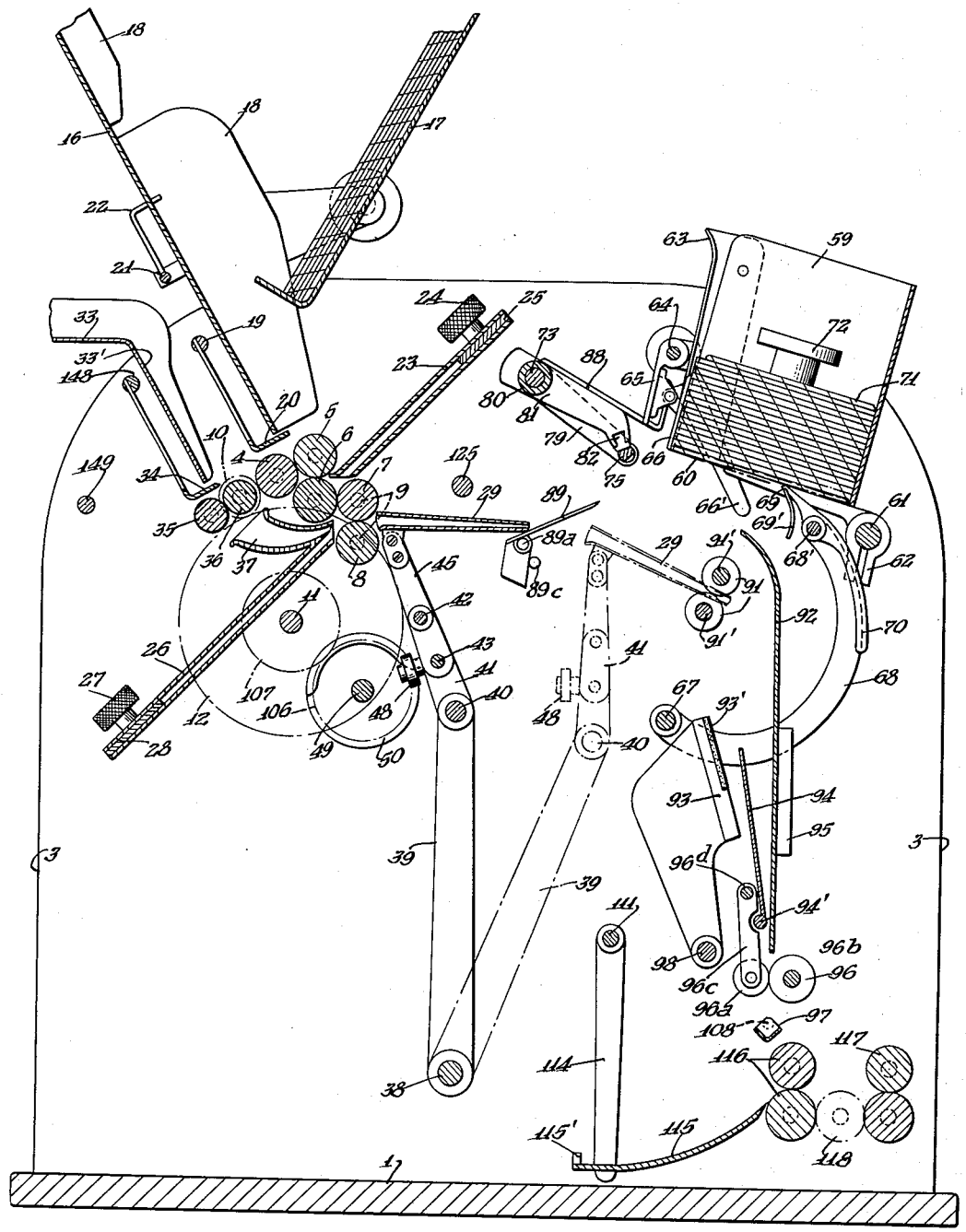

The lowermost envelope having been extracted from the magazine 59 and positioned over the guide tongues 89, as shown in Fig. 10 and as hereinbefore described, and a letter or other sheet having been previously fed, folded and inserted into the expanded stuffing device 29 with or without supplemental inserts fed from the plate 33, said stuffing device in contracted condition is then rocked forwardly about the axis 38, effected by the contracting action of the spring 52 under the control of the cam 55, until the leading open end of the stuffing device projects a short distance beyond the bite of two axially spaced pairs of opposed stripping rollers 91, as shown in broken lines in Fig. 1, both sections of the stuffing device 29 being provided with openings 90 (Fig. 6) to receive said rollers. Under these conditions, the stuffing device 29 passes over the guide tongues 89 and under the extended flap of the extracted envelope, depresses said tongues and therewith the body portion of said envelope, and then enters the mouth of the envelope in a downwardly inclined position until the leading end thereof engages the closed end of said envelope, all as shown in Fig. 11. Entry of the stuffing device 29 in a downwardly inclined position into the extracted envelope causes the insert or inserts to slide relatively to said device toward and into engagement with the closed end of the envelope. Simultaneously with or just prior to engagement of the stuffing device 29 with the closed end of the extracted envelope, the grippers 75 and 82 are opened through engagement of the roller 85 with the arm 87 and lifting of the gripper arms 81 resulting therefrom, whereupon the stuffing device 29, through continued forward movement thereof, advances the released envelope between the stripping rollers 91 which then remove or strip said envelope together with the insert or inserts from the stuffing device and further advance the envelope with the insert or inserts therein toward and into engagement with a vertically disposed deflecting plate 92.

After release of the envelope by the grippers 75, 82, the gripper arms 81 are returned to their original positions (Fig. 7) through engagement of the high part of cam 84 with the roller 83', and the gripper bar 75 is thereafter rocked toward said arms by the contracting action of the spring 77' to engage the extended flap of the next envelope during the next cycle of operation of the machine. The stripping rollers 91 are secured to intergeared transverse shafts 91' which are journalled at their opposite ends in suitable bearings in the side members 2, 3. The rollers 91 are rapidly rotated to strip the envelope and inclosure as a unit from the stuffing device 29, and for this purpose, one of the shafts 91' has secured thereto exteriorly of the side member 2 a pinion 160 which is continuously driven by the gear 12 through intermediate gears 157, 158 and 159 suitably journalled on the side member 2.

As shown in Fig. 11, the deflecting plate 92 directs the envelope with the insert or inserts therein downwardly with the closed end of the envelope leading between a moistening device 93 and a heating element 95 and between feed rollers 96 and cooperating spring-pressed pressure rollers 96ª which further advance said envelope until the latter comes to rest in vertical position on a transverse trough-like or V-shaped bar 97. The moistening device 93 has embedded in the outer face thereof a felt pad or tape 93' which is of the same shape and size as the gummed portion of the envelope-flap and is moistened in a suitable manner by suitable means (not shown) for this purpose. Engagement of the envelope with the bar 97 locates the sealing flap in accurate position for moistening of the gummed portion of said flap by the pad 93' hastened by the heating element 95.

The moistening device 93 is secured to a transverse rock shaft 98 for pivotal movement towards and away from the heating element 95 to engage the moistened pad 93' with the gummed portion of the envelope-flap and press the latter against the heating element 95, and to thereafter release the moistened envelope-flap. Shaft 98 is journalled at its ends in suitable bearings in the side members 2, 3 and has secured thereto exteriorly of the side member 2 an arm 99 (Fig. 2). Pivotally connected to arm 99 is one end of an adjustable link 100 the opposite end of which is pivotally connected to an arm 101 which is pivotally mounted at 102 on the side member 2. Arm 101 has journalled thereon a roller 101' which engages a cam 103 that is journalled on a stud 104 secured in the side member 2. Secured to the cam 103 is a gear 105 which meshes with and is driven by the gear 58 of the same size to make one revolution for each cycle of operation of the machine. Roller 101' is maintained in engagement with cam 103 by an extension coil spring 99' having one end thereof connected to the arm 99 and the opposite end suitably anchored to the side member 2. The moistening device 93 is thus cam operated by cam 103 towards the heating element 95 to moisten the sealing flap of the envelope resting on bar 97, as shown in Fig. 12, and is spring operated by spring 99' away from the moistened sealing flap to its original position, shown in Fig. 11. The heating element 95 which may be of the electrical, thermostatically controlled type is suitably carried by the side members 2, 3 in fixed relation to the moistening device 93.

The feed rollers 96 are secured in axial spaced relation on a transverse shaft 96$^b$ which is journalled at its opposite ends in suitable bearings in the side members 2, 3. The feed rollers 96 are continuously rotated by means of a chain 156 (Fig. 2) disposed exteriorly of the side member 2 and which engages a sprocket 156$^a$ that is secured to the feed-roller shaft 96$^b$. The chain 156 passes around and is driven by a sprocket 156$^b$ which is secured to the driven stripping-roller shaft 91' and is disposed between the pinion 160 and the side member 2. The chain 156 also passes around and drives a sprocket 156$^c$ which is secured to one of the journals of a pair of cooperating delivery rollers 116 hereinafter referred to, and further passes around an idler sprocket 156$^d$ adjustably carried by the side member 2. The pressure rollers 96$^a$ are journalled on spring-pressed arms 96$^c$ which are pivotally mounted on a transverse shaft 96$^d$ that is fixed at opposite ends thereof in the side members 2, 3.

In order to insure moistening of the gummed portion only of the envelope-flap, a flap-masking or protecting plate 94 is vertically disposed between the moistening device 93 and the heating element 95 and has its upper end extending to the pad 93' and shaped to conform to the contour of said pad and the gummed portion of the envelope-flap. The plate 94 is secured at its lower end to a transverse shaft 94' which is journalled for free rocking movement at its opposite ends in suitable bearings in the side members 2, 3. The plate 94 is normally disposed in the position thereof shown in Fig. 11 so as not to obstruct the downward movement of the envelope and to guide said envelope between the rollers 96 and 96$^a$. When the moistening device 93 is rocked towards the heating element 95 to moisten the gummed portion of an envelope-flap, the plate 94 is rocked by said device into flap-protecting position, as shown in Fig. 12, and when the moistening device 93 is rocked away from the moistened envelope-flap, the plate 94 swings by gravity away from the envelope and returns to its original position.

The V-shaped envelope-supporting bar 97 is provided at opposite ends thereof with axially aligned pins 108 which are eccentrically located on said bar and are journalled in suitable bearings in the side members 2, 3. The bar 97 is normally disposed in the position thereof shown in Figs. 1 and 11 to receive and support an envelope during the moistening of the flap thereof by the moistening device 93. When the gummed portion of the envelope-flap has been moistened and said flap is released by the moistening device 93, the bar 97 is rocked approximately 90 degrees out of supporting relation with the envelope, whereupon said envelope is released by said bar and is immediately advanced further downwardly onto and along a curved plate 115 by the action of the rollers 96, 96$^a$ thereon. The pressure rollers 96$^a$ are preferably adjusted relatively to the feed rollers 96 such that they frictionally engage the body portion only of the envelope, thus avoiding contact of said rollers 96$^a$ with the moistened gummed portion of the envelope-flap and transfer of adhesive thereto.

Figure 6:
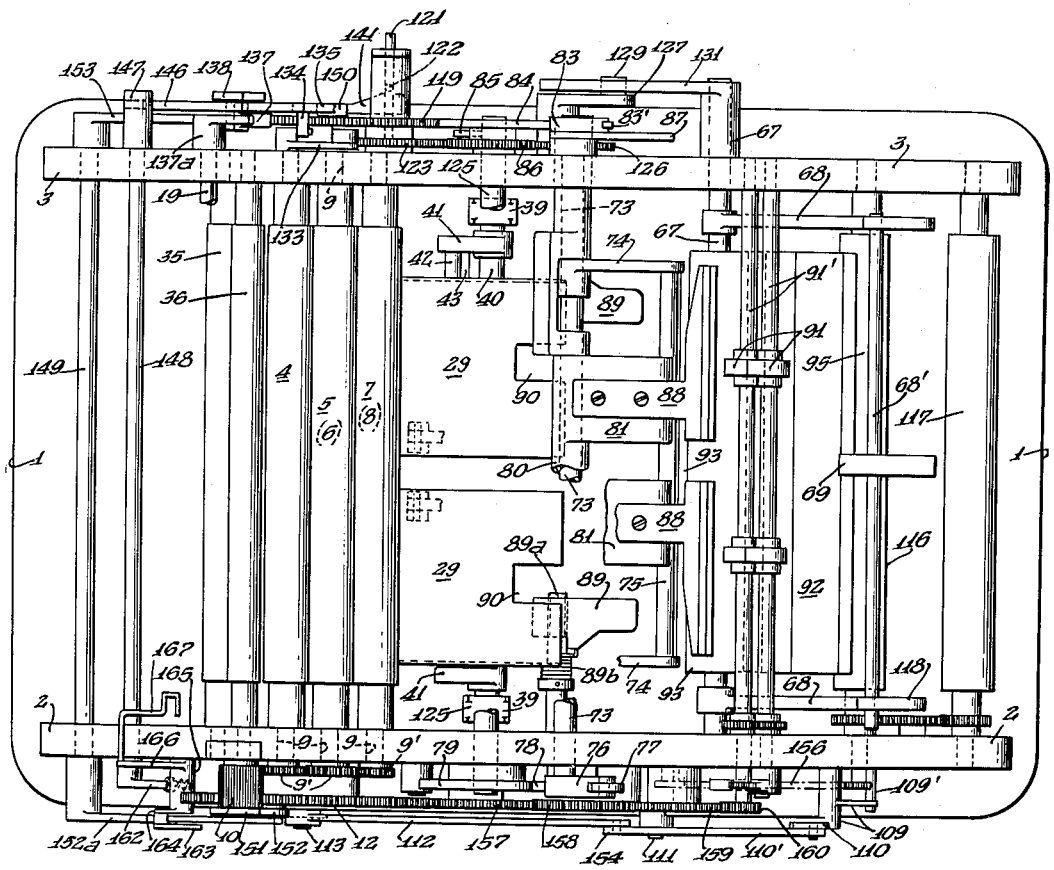
Fig. 6 is a top plan view of said machine, with parts omitted for purposes of clear illustration.

As shown in Figs. 2 and 6, rocking motion is continuously imparted to the envelope-supporting bar 97 by a bell-crank lever 109 secured to one of the pins 108 exteriorly of the side member 2 and having one arm thereof arranged to engage a stop pin 109' carried by said side member for locating said bar in accurate envelope-receiving and supporting position, as shown in Fig. 11. In this position of the bar 97, the other arm of the bell-crank lever 109 is engaged by a roller 110 journalled on the arm 110' of a second bell-crank lever, the other arm of which is indicated at 154. The bell-crank lever 110', 154 is secured exteriorly of the side member 2 to a transverse shaft 111 which is journalled in suitable bearings in the side members 2, 3. Pivotally connected to the bell-crank arm 154 is one end of an adjustable link 112 the opposite end of which is pivotally connected to a crank-pin 113 which is secured in the single revolution, main drive gear 12. It will thus appear that through continuous rotation of the gear 12 one complete revolution in the direction of the arrow indicated in Fig. 2, the envelope-supporting bar 97, through engagement of the roller 110 with one arm of the bell-crank 109, will be rocked in one direction to the position thereof shown in Fig. 12 to release the envelope, and through subsequent engagement of said roller with the other arm of said bell-crank, will be rocked in the opposite direction to the position shown in Fig. 11 in readiness to receive and support the next or succeeding envelope fed into the machine, said operations occuring in timed relation with the operation of the moistening device 93.

When the moistened envelope with the insert or inserts therein is advanced by the rollers 96, 96$^a$ onto and along the curved plate 115 and is released by said rollers, said envelope slides further along said plate by gravity and momentum with its closed end leading and its moistened sealing flap uppermost and partly folded, as shown in broken lines in Fig. 12, until it engages stops 115' carried by said plate at the rear end thereof. Engagement of the envelope with the stops 115' locates the forward flap-end thereof adjacent a pair of cooperating, intergeared, delivery rollers 116 which are continuously driven by the chain 156, as hereinbefore described. The plate 115 is suitably supported on the side members 2, 3, and the curvature thereof is concentric with the axis of the shaft 111.

Upon engagement of the envelope with the stops 115, said envelope is engaged at the closed end thereof by transversely spaced, oscillating kicker-arms 114 and forwardly ejected by said arms between the delivery rollers 116, whereupon the moistened flap is completely folded onto the body of the envelope and pressed against the same by said rollers. The arms 114 are secured to the shaft 111 and extend downwardly therefrom below the plate 115 and operate in suitable slots formed in said plate. By virtue of the described mounting of the arms 114 on the shaft 111, said arms are operated in timed relation with the operation of the envelope-supporting bar 97 and by the same mechanism which operates said bar. Accordingly, when the bar 97 is rocked out of supporting relation with the envelope thereon to release said envelope, the arms 114 are rocked to their rearmost inoperative position (Fig. 12), and when said bar is rocked into envelope-receiving and supporting position, said arms are rocked to their foremost operative position to eject the released envelope from the plate 115 between the delivery rollers 116. From the delivery rollers 116, the sealed envelope passes between a second pair of cooperating, intergeared delivery rollers 117 which serve to further iron the sealed flap and to discharge the sealed envelope from the machine into a receptacle (not shown) or onto a stacking or other conveyor, as desired. The delivery rollers 117 are continuously rotated from the rollers 116 through an intermediate gear 118 suitably journalled on the side member 2.

In the illustrated embodiment, when the electric motor 15 is started to drive the machine, the rollers 4 to 8, inclusive, 35, 36, 91, 96, 116 and 117, and the envelope-supporting bar 97 and kicker-arms 114 are continuously operated by the described means for this purpose. The operation of the other devices, such as, the stuffing pocket 29, the envelope-flap-opening member 69, the envelope-extracting grippers 75, 82, and the envelope-flap-moistening device 93 are, however, clutch controlled and in the present instance are under the control of the operator, so that said devices may be operated only when and so long as insert material is present on one or the other or both of the feed tables 16, 33 for entry into the machine. In this manner, idle operation of said devices and of the various parts therefor is completely avoided, resulting in prolonged life of the machine.

Figures 3, 3A:
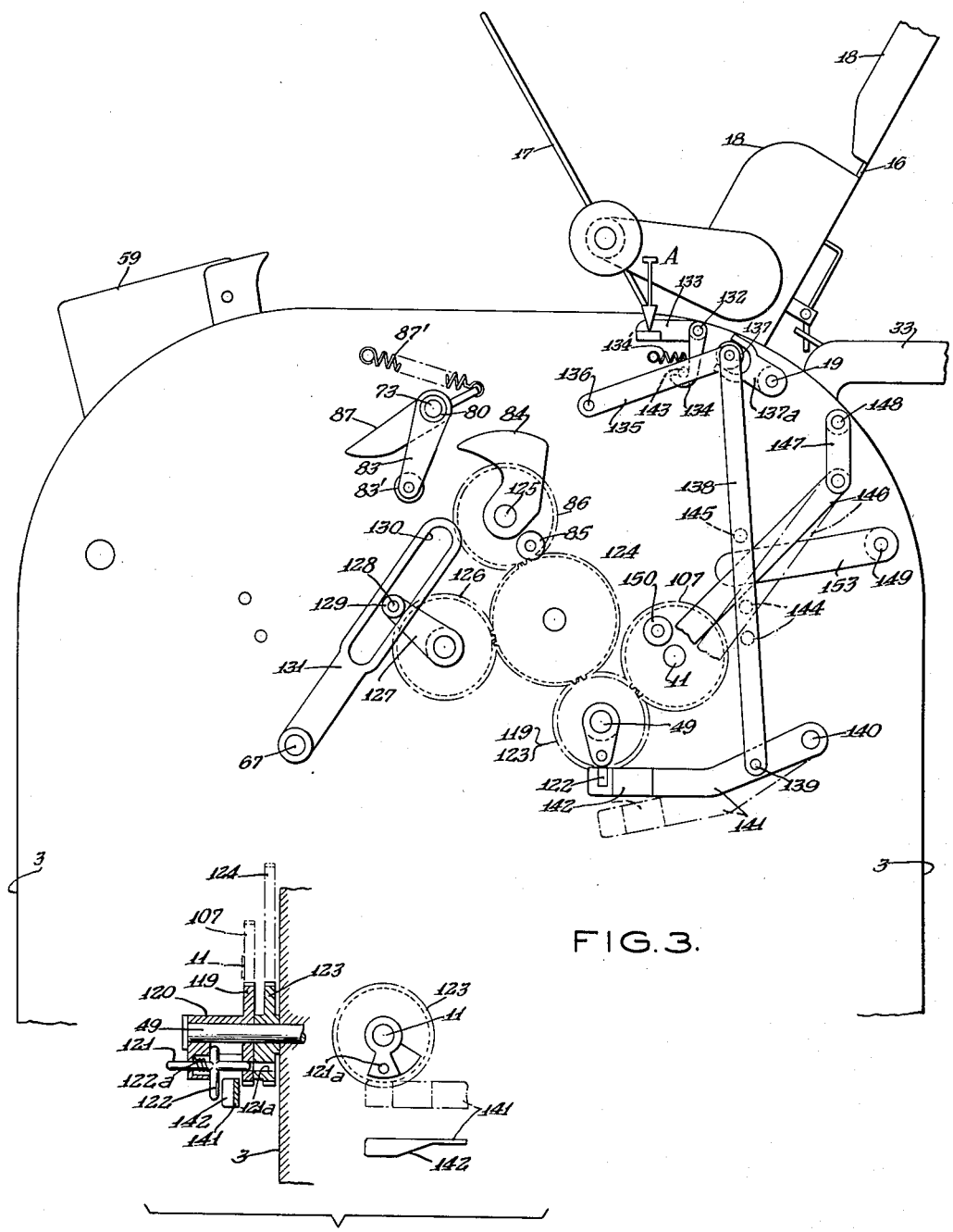
Fig. 3 is an elevational view looking toward the opposite side of said machine.
Fig. 3a is a detail vertical transverse sectional view of driving and coupling means, and including a detail side view of the driven gear, and a fragmentary top plan view of the coupling control lever.

As shown in Figs. 2, 3 and 3a, the clutch-controlled operation of the above devices under the control of the operator is effected by the following instrumentalities constructed, mounted and operated as follows. Secured to the motor driven, single revolution, main drive shaft 11 exteriorly of the side member 3 is a gear 107 which meshes with and drives a similar gear 119 of the same size which is loosely mounted on the shaft 49 and is formed with an extended hub 120. Slidably carried by the hub 120 of gear 119 for axial movement relative to said gear and the shaft 49 is a coupling pin 121 which is adapted under certain conditions to enter a suitable axially aligned opening 121a formed in a gear 123 which is fixed on the shaft 49 between the gear 119 and the side member 3. The coupling pin 121 is provided with a radially projecting pin portion 122, and is yieldingly urged towards the gear 123 by a compression coil spring 122a surrounding the same and disposed between the portion 122 and the hub 120. The gear 123 meshes with an intermediate gear 124 which, in turn, meshes with the gear 86 and with a gear 126. The gears 86 and 126 are the same size as the gear 123 and, hence, they also will make one revolution for each cycle of operation of the machine. The gear 86 carries the gripper-opening roller 85, as hereinbefore described, and is fixed on and drives the shaft 125 which, as hereinbefore described, carries the cams 79 and 84 for effecting the closing of the gripper elements 75, 82 and the envelope-extracting operation thereof. The gear 126 is suitably journalled on the side member 3 and carries a crank-arm 127 having a roller 129 journalled at 128 thereon. Roller 129 is engaged in an elongated opening 130 formed in an arm 131 which is secured to the shaft 67 to impart rocking motion thereto, said shaft effecting the operation of the envelope-flap opening member 69, as hereinbefore described.

It will thus appear that when the coupling pin 121 is disengaged from the gear 123, said gear will not be rotated and the driven gear 119 will merely rotate idly on the shaft 49. Accordingly, shaft 49 will not be rotated to effect operation of the stuffing device 29, the moistening device 93 and the described operating connections therefor, and the gears 86, 126, and the shaft 125 will not be rotated to effect operation of the flap-opening member 69, the extracting gripped elements 75, 82 and the described operating connections therefor.

Engagement of the coupling pin 121 with the gear 123 to provide for operation of the stuffing device 29, the flap-opening member 69, the extracting gripper elements 75, 82 and the moistening device 93 in proper timed relation with each other is controlled by the operator through the medium of a key, push-button, or the like, conveniently located at the A position (Fig. 3) and which is adapted to engage one arm 133 of a bell-crank lever, the other arm of which is in the form of a latch and indicated at 134. The bell-crank 133, 134 is pivotally mounted as at 132 on and exteriorly of the side member 3, and the latch-arm 134 of said bell-crank is adapted to normally engage a pin 143 which is secured to and projects inwardly from an arm 135 which is pivotally mounted as at 136 on the side member 3. The latch-arm 134 is yieldingly urged toward and into engagement with the pin 143 by an extension coil spring 134' having one end thereof connected to said arm and the opposite end connected to the side member 3. Engagement of the latch-arm 134 with the pin 143 holds the arm 135 in its raised position (Fig. 3) and against pivotal downward movement.

The arm 135 has journalled thereon at the free end thereof a roller 137 which is engaged in a bifurcated arm 137a. This arm 137a is secured to the shaft 19 which carries the described sheet arresting stops 20 associated with the sheet positioning plate 16. Pivotally connected to the arm 135 at the free end thereof is the upper end of a connecting link 138, the lower end of which is pivotally connected as at 139 to a coupling control lever 141. This lever 141 is pivotally mounted as at 140 on the side member 3 and is formed at the free end and outer side thereof with a cam-track 142 which is disposed in the path of rotation of the portion 122 of the coupling pin 121 to cause disengagement of said pin from the gear 123 and to normally hold the same in disengaged position (Fig. 3a) during rotation of the gear 119.

It will thus be apparent that when the bell-crank 133, 134 is manually rocked against the tension of the spring 134' to disengage the latch-arm 134 from the pin 143, the arm 135 is released and immediately drops by gravity aided by the weight of the link 138 and lever 141, resulting in downward pivotal movement of the lever 141 and arm 137a. Under these conditions, the coupling pin 121 is released by the lever 141 to enter the opening 121a in the gear 123 under the expanding action of the spring 122a and thereby couple said gear with the driven gear 119, and at the same time the shaft 19 is rocked by the arm 137a and thereby swings the gage-stop 20 downwardly away from the feed plate 16 and out of the path of movement of the letter or other sheet on said plate. Thereupon the letter or other sheet slides from the plate 16 and passes through the machine for subsequent folding and delivery to the stuffing device 29, and said device, the envelop-flap opening member 69, the envelope-extracting grippers 75, 82, and the envelope-flap moistening device 93 are operated, as hereinbefore described, in timed relation with each other and with the operation of the gage-stop 20 to open the flap of an envelope, extract said envelope from the magazine 59, insert the folded letter or other sheet therein, and moisten the sealing flap thereof. It will be noted that although the key-controlled bell-crank lever 133, 134 may be actuated at any time by the operator, the coupling pin 121 can only enter the opening 121a in the gear 123 when said pin is in axial alignment with said opening, thus the relative timing of the operation of the devices 29, 69, 75, 82 and 93 with respect to each other and to the operation of the gage-stop 20 is maintained and insured.

Secured to the link 138 in vertical spaced relation and projecting inwardly from said link are two pins 144 and 145 between which is angularly disposed a bar 146. This bar 146 is pivotally connected at its upper end to an arm 147 which, in turn, is secured to the shaft 148 which carries the gage-stop 34 associated with the second feed plate 33 for the supplemental inclosures or inserts. The bar 146 rests by gravity on the pin 144 so that when the link 138 is lowered to effect engagement of the coupling pin 121 with the gear 123, as described, said bar will also drop by gravity to the broken line position thereof shown in Fig. 3 for abutting engagement at the extreme lower end thereof by a roller 150 which is journalled on the continuously driven, single revolution gear 107. Engagement of the roller 150 with the bar 146 imparts upward bodily movement to said bar, whereupon the arm 147 and therewith the shaft 148 are rocked in the proper direction to swing the gage-stop 34 downwardly away from the feed-plate portion 33' and out of the path of movement of the supplemental inclosure or insert on said plate portion. Thereupon the supplemental inclosure, which may be a card, paper slip, return envelope, leaflet, or the like, slides from the plate 33, 33' and passes through the machine into the stuffing pocket 29 for subsequent insertion, together with the folded letter or other sheet, into the envelope. The operation of the gage-stop 34 thus also occurs only when the coupling 120, 123 is engaged, and said operation is so timed with respect to the operation of the gage-stop 20 that the supplemental inclosure or insert will meet the letter or other sheet substantially at the same time that the second fold is made therein, whereby said enclosure will pass between the rollers 7, 8 within the twice folded letter or other sheet and will be disposed within and between the plies of said sheet. When the roller 150 moves out of engagement with the bar 146 through continued rotation of the gear 107, said bar, the arm 147, shaft 148 and gage-stop 34 are returned to their original positions by the contracting action of an extension coil spring 161 (Fig. 2) having one end thereof connected to the side member 2 and the opposite end connected to an arm 162 which is disposed exteriorly of said side member and secured to the adjacent end of the shaft 148.

It will be apparent that the machine may be utilized, as desired, to fold and insert folded letter or other sheets only into the envelopes by merely employing only the feed table 16, or to hold and insert folded letter or other sheets with supplemental enclosures into the envelopes by employing both feed tables 16 and 33, or to insert simple enclosures such as, for example, cards, paper slips, leaflets, etc., into the envelopes by merely employing the feed table 33. It will also be apparent that one or the other of the fold plates 23, 26 may, through the provision of the usual deflectors (not shown), be rendered inoperative in accordance with the size of the sheet and the requirement as to the number of folds that are to be made therein.

When the coupling 120, 123 is engaged and the machine has completed one cycle of operation, resulting in the discharge of a single sealed envelope therefrom, the coupling 120, 123 is again disengaged, whereupon the various devices under the control of said coupling are stopped in their original positions in readiness for the performance thereof on the next insert-envelope unit. This disengagement of the coupling 120, 123 and timing thereof is effected by an arm 151 which is secured to the outer surface of the continuously driven, single revolution, main drive gear 12 (Fig. 2). The arm 151 is provided at the upper end thereof with a cam surface 151' which is adapted to engage a roller 152 which is journalled on the free end of an arm 152ª. This arm 152ª is secured to one end of a transverse shaft 149 which is journalled in suitable bearings in the side members 2, 3. Secured to the opposite end of the shaft 149 exteriorly of the side member 3 is another arm 153 (Fig. 3) which is disposed between said side member and the bar 146 and extends beneath the pin 145 on the link 138.

It will thus be apparent that when the coupling 120, 123 is engaged through downward movement of the link 138, as above described, and the machine has completed one cycle of operation, the cam-arm 151, through continued rotation with the gear 12, will engage the roller 152, rock the arm 152ª upwardly, and then move beyond said roller and release said arm to return to its original position by gravity aided by suitable spring means if necessary. This motion of the arm 152ª is transmitted through the shaft 149 to the arm 153 which, in turn, engages the pin 145 and thereby raises the link 138, lever 141, arms 135 and 137ª until the latch arm 134 snaps beneath the pin 143, at which time the arm 152ª swings downwardly and releases the link 138 for downward movement in the next cycle of operation of the machine. As a result of the upward movement of the lever 141 and arm 137ª, the coupling pin 121 is withdrawn from the gear 123 through engagement of the pin-portion 122 with the cam-track 142 on the raised lever 141, thus disconnecting the drive to the gear 123, and the gage-stop 20 is returned to its original position to receive and hold the next letter or other sheet in readiness for feeding into the machine at the beginning of the next cycle of operation of said machine when the control key and/or bell-crank lever 133, 134 is again depressed and the coupling 120, 123 is again engaged. It is to be understood that suitable locking means may be provided to hold the control key and/or bell-crank lever 133, 134 in depressed position so that all of the described timed mechanisms will operate continuously in timed relation with each other.

The operation of the auxiliary gage-stops 22 is timed to occur at or near the end of each cycle of operation of the machine so that the next and succeeding letter or other sheets placed on the feed plate 16 and in position against said stops will be released by the latter at or near the end of each preceding cycle to slide along said plate into position against the gage-stop 20 in readiness for feeding into the machine in the next and each succeeding cycle of operation of the machine. For this purpose, the arm 152ª which, as hereinbefore described, is operated by the cam-arm 151 on the gear 12 at the end of each cycle of operation of the machine has pivotally connected thereto one end of a link 163 (Fig. 2), the opposite end of which is pivotally connected to one arm 164 of a bell crank 165, the other arm of which is indicated at 166. Secured to the arm 166 is a rod 167 which is offset inwardly and straddles a pin 168 secured to the shaft 21 which carries the auxiliary gage-stops 22. It will thus be apparent that when the arm 152ª is rocked upwardly by the cam-arm 151 to effect disengagement of the coupling 120, 123 at the end of each cycle of operation of the machine, as hereinbefore described, the auxiliary gage-stops 22 will, through the described operating connections therefor with the arm 152ª, be rocked downwardly at the same time and thereby release the letter or other sheet positioned against the same for sliding movement along the feed plate 16 into engagement with the gage-stop 20. When the arm 152ª is thereafter rocked downwardly, the auxiliary gage-stops 22 will be rocked upwardly and returned to their original positions to receive a succeeding letter or other sheet.

The operation of the sheet folding, envelope stuffing and sealing machine constructed in accordance with the present invention will be clearly understood from the foregoing description, and while said description and the accompanying drawings set forth with more or less particularity one embodiment of the invention, it is to be expressly understood that said invention is not limited to said embodiment. Various changes may be made therein, particularly in the design and arrangement of the parts illustrated, as well as in the mode of operation and manner of use, without departing from the spirit and scope of the invention, as will now be clear to those skilled in the art. For a definition of the limits of the invention, reference is had primarily to the appended claims.

What is claimed is:

1. In apparatus of the class described, a horizontally extending stuffing device movable from a first position along a predetermined path to a second position, said stuffing device being arranged to receive a folded sheet therewithin when the stuffing device is in said first position, means for positioning an envelope in said path of movement of the stuffing device and intermediate said first and second positions of the stuffing device with the sealing flap of the envelope extended and the mouth of the envelope open and facing said stuffing device when the latter is in its first position, means for moving said stuffing device from its first position along said path to cause the stuffing device with the folded sheet carried thereby to enter the envelope and to carry the envelope with it to said second position, and means arranged and operable at said second position for stripping the envelope and folded sheet edgewise from said stuffing device with said folded sheet disposed within said envelope.

2. Apparatus as defined in claim 1, comprising releasable horizontally extending stop means disposed below the stripping means onto which the envelope is delivered to stand on its lower closed end thereon, means for moistening the gummed area of the sealing flap of said envelope while the latter is so supported, a support disposed below said stop means, flap closing and pressing means arranged forwardly of said support, means for operating said stop means to release the moistened envelope for downward movement onto and along said support with the closed end of said envelope leading away from said flap closing and pressing means, means for arresting the movement of the envelope along said support and for positioning said envelope with its sealing flap partly folded and located adjacent said flap closing and pressing means, and operable means for moving the envelope along said support in the reverse direction towards and into operative engagement by said flap closing and pressing means.

3. In apparatus of the class described, a horizontally extending stuffing device movable from a first position in which it lies generally horizontal along a predetermined path to a second position in which its leading end lies substantially lower than its trailing end, said stuffing device being arranged to receive an inclosure therewithin when the stuffing device is in said first position, means for positioning an envelope in said path of movement of the stuffing device and intermediate said first and second positions of the stuffing device with the sealing flap of the envelope extended and the mouth of the envelope open and facing said stuffing device, means for moving said stuffing device along said path to cause the stuffing device with the folded sheet carried thereby to enter the envelope and carry the envelope with it to said second position, a pair of opposed driven rollers arranged at said second position to receive the closed end of the envelope therebetween so as to strip the envelope and its inclosure edgewise from the stuffing device and to forward them downwardly at a marked angle to the horizontal, and a vertical deflecting plate positioned beyond the rollers to intercept the forwarded stripped envelope and to divert it into a vertical path.

4. In apparatus of the class described a horizontally extending stuffing device arranged to receive a folded sheet at a first position thereof, the stuffing device being in the form of an open-ended flattened wedge-shaped tube arranged to receive the folded sheet through its wider end and transversely divided into two aligned sections, the stuffing device being movable from said first position along a predetermined path to a second position, means for positioning an envelope in said path of movement of the stuffing device and intermediate said first and second positions of the stuffing device with the sealing flap of the envelope extended and the mouth of the envelope open and facing said stuffing device, means for moving said stuffing device along said path to cause the same with the folded sheet carried therein to enter the envelope and carry the latter therewith to said second position, means arranged and operable at said second position for stripping the envelope and folded sheet edgewise from said stuffing device with said folded sheet disposed within said envelope, means mounting the sections of the stuffing device for pivotal movement as a unit about a horizontal axis along said path and providing for lateral movement of one section towards and away from the other section, and means for moving the said one section away from the said other section to expand said tube for the reception of the folded sheet therein and for thereafter moving the said one section towards the said other section to contract said tube for the introduction of the latter into the envelope.

5. In apparatus of the class described, a horizontally extending stuffing device arranged to receive a folded sheet at a first position thereof and movable from said first position along a predetermined path to a second position, means for positioning an envelope in said path with its sealing flap extended and its mouth open and facing said stuffing device, means for moving said stuffing device along said path to cause the same with the folded sheet to enter the envelope and carry the latter therewith to said second position, means arranged and operable at said second position for stripping the envelope and folded sheet edgewise from said stuffing device with said folded sheet disposed within said envelope, a horizontally rotatable member disposed below the stripping means and provided with a trough into which the envelope is delivered to stand on its closed end on said member, moistening means disposed above said member and operable toward and away from the sealing flap of said envelope to moisten the gummed area of said sealing flap while the envelope is so supported in standing position on said member and then to release the moistened sealing flap, a backing element for supporting said sealing flap while moisture is applied thereto by said moistening means, a concave support disposed below said member, a pair of horizontally extending vertically arranged driven rollers disposed forwardly of said support, means for rotating said member to release the moistened envelope from the trough thereof for downward movement onto and along said support with the closed end of said envelope leading away from said rollers, means for arresting the movement of the envelope along said support and for positioning said envelope with its sealing flap partly closed and located adjacent said rollers, and operable means engageable with the closed end of the envelope for moving the latter along the support towards and between said rollers for closing and pressing of the sealing flap thereby against the body of said envelope.

6. Apparatus as defined in claim 5 comprising a heating element disposed opposite the moistening means for applying controlled heat to the sealing flap of the envelope while moisture is applied thereto by said moistening means.

7. Apparatus as defined in claim 5 comprising a masking element loosely mounted below the moistening means for free pivotal movement and extending between said moistening means and the envelope for confining the application of moisture to the gummed area of the sealing flap of said envelope.

8. Apparatus as defined in claim 5 comprising cooperating horizontally extending driven feed and pressure rollers disposed between the moistening means and the trough-member for imparting downward movement to the envelope into engagement with said member and for further imparting like movement to said envelope when released by said member.

9. In apparatus of the class described, a horizontally extending stuffing device movable from a first position along a predetermined path to a second position, means to feed an inclosure into said stuffing device when the latter is in its first position, yieldable blade means mounted below said path and extending at an angle across said path forwardly of said stuffing device and in the direction of movement of said stuffing device, means for positioning an envelope in said path of movement of the stuffing device and intermediate said first and second positions of the stuffing device and on said blade means in telescoped relation with the sealing flap thereof extending over said blade means and with its mouth open and facing said stuffing device, means for moving said stuffing device along said path to cause the stuffing device with its inclosure to pass over said blade means between the latter and the sealing flap and into the envelope and to carry the envelope with it to said second position, and means arranged and operable at said second position for stripping the envelope and its inclosure edgewise from said stuffing device with said inclosure disposed within said envelope.

10. In apparatus of the class described, a substantially horizontal stuffing pocket transversely divided into two aligned sections, means mounting said sections for movement as a unit along a predetermined path from a first position to a second position and providing for lateral movement of one of said sections towards and away from the other of said sections, means for feeding an inclosure into said pocket at said first position, means for moving the said one section away from the said other section to expand said stuffing pocket for the reception of said inclosure therein and for thereafter moving the said one section towards the said other section to contract said stuffing pocket, means for positioning an envelope in said path intermediate said positions with its sealing flap extended and its mouth open and facing said stuffing pocket, means for moving the contracted pocket-sections along said path to cause the same with the inclosure therein to enter the envelope and carry the latter therewith to said second position, and means arranged and operable at said second position to grip the envelope at opposite sides thereof and strip said envelope and therewith the inclosure edgewise from said stuffing pocket with said inclosure disposed within said envelope.

11. In apparatus of the class described, a substantially horizontal open-ended flattened wedge-shaped tube transversely divided into two aligned sections, means mounting said sections for pivotal movement as a unit about a horizontal axis along a predetermined path from a first position to a second position and providing for lateral movement of one of said sections towards and away from the other of said sections, means for feeding an inclosure into said tube at said first position and through the wider open end thereof, means for moving the said one section away from the said other section to expand said tube for the reception of said inclosure therein and for thereafter moving the said one section towards the said other section to contract said tube, means for positioning an envelope in said path intermediate said positions with its sealing flap extended and its mouth open and facing said tube, means for swinging the contracted tube along said path to cause the same with the inclosure therein to enter the envelope and carry the latter therewith to said second position, and a pair of opposed horizontally extending driven rollers arranged at said second position to receive the envelope therebetween and strip said envelope and therewith the inclosure edgewise from said tube with said inclosure disposed within said envelope, said tube having end portions thereof removed to enable engagement of said rollers with the envelope.

12. In apparatus of the class described, a substantially horizontal stuffing device, means for feeding an inclosure to said stuffing device, means mounting said stuffing device for movement along a predetermined path from its inclosure receiving position to a second position, yieldable blade means mounted below said path and extending at an angle across said path forwardly of said stuffing device and in the direction of movement of said stuffing device, a magazine spaced above and forwardly of said stuffing device and said blade means for holding a supply of envelopes placed flatwise therein with their sealing flaps folded and at the bottom and extending in a direction away from said stuffing device, flap opening means operable to unfold the sealing flap of the lowermost envelope in the magazine in a direction towards said stuffing device and to extend said flap beyond said magazine, pivoted extracting means operable to grip the extended flap of the lowermost envelope, extract said envelope from said magazine downwardly and rearwardly in the direction of said blade means and engage said envelope on said blade means, means for moving said stuffing device along said path to cause the same with the inclosure to pass over said blade means between the latter and the extended sealing flap and into the envelope and carry said envelope therewith to said second position, and means arranged and operable at said second position for stripping the envelope and the inclosure therewith edgewise from said stuffing device with said inclosure disposed within said envelope.

13. Apparatus as defined in claim 12, comprising means carried by the envelope-extracting means for pressing the extended flap of the envelope against the blade means to thereby expand the mouth of said envelope and facilitate entry of said blade means therein.

14. Apparatus as defined in claim 12, wherein the envelope-flap opening means comprises a pivotally mounted element having a thin edge at the leading end thereof and a flap-deflecting portion depending from said end and having a concave flap engaging surface, weight means carried by said element for continuously urging the same into engagement with the surface of the lowermost envelope in the magazine, and means for imparting reciprocating motion to said element lengthwise of the magazine and the envelope-supply.

15. Apparatus as defined in claim 12, wherein the bottom wall of the magazine is spaced at its rear end from the rear wall of said magazine to provide an outlet for the extraction of the lowermost envelope from the magazine, and said rear wall is spaced at its lower end from said bottom wall to facilitate extending of the sealing flap of said lowermost envelope beyond said magazine, and comprising a gate-member pivotally mounted on said magazine and movable to a position below and substantially in line with said rear wall to hold the next lowermost envelope from movement with the lowermost envelope when the latter is extracted from said magazine, and means actuated by the flap opening means for swinging said gate-member away from said magazine when the sealing flap of the lowermost envelope is unfolded and extended.

References Cited in the file of this patent

UNITED STATES PATENTS

| | | |
|---|---|---|
| 946,071 | Robbins | Jan. 11, 1910 |
| 1,151,792 | Jaeger | Aug. 31, 1915 |
| 1,543,842 | Gwinn et al. | June 30, 1925 |
| 1,886,119 | Price | Nov. 1, 1932 |
| 2,022,475 | Moore | Nov. 26, 1935 |
| 2,114,814 | Rosebush | Apr. 19, 1938 |
| 2,214,265 | Wuille | Sept. 10, 1940 |
| 2,482,060 | Gates et al. | Sept. 13, 1949 |
| 2,583,746 | Peterson | Jan. 29, 1952 |
| 2,628,465 | Penley | Feb. 17, 1953 |